United States Patent
Orchard

(10) Patent No.: US 11,345,098 B2
(45) Date of Patent: May 31, 2022

(54) CONTINUOUS MOLDED CARBON FIBER REINFORCED POLYMER SLENDER CURVED COMPONENT

(71) Applicant: Airbus SAS, Blagnac (FR)

(72) Inventor: Matthew Noel Orchard, Blagnac (FR)

(73) Assignee: AIRBUS SAS, Blagnac (FR)

( * ) Notice: Subject to any disclaimer, the term of this patent is extended or adjusted under 35 U.S.C. 154(b) by 0 days.

(21) Appl. No.: 16/867,675

(22) Filed: May 6, 2020

(65) Prior Publication Data

US 2020/0353700 A1    Nov. 12, 2020

Related U.S. Application Data

(60) Provisional application No. 62/844,951, filed on May 8, 2019.

(51) Int. Cl.
| | |
|---|---|
| *B29C 70/16* | (2006.01) |
| *B29C 70/54* | (2006.01) |
| *B29L 31/00* | (2006.01) |
| *B29K 307/04* | (2006.01) |

(52) U.S. Cl.
CPC ............ *B29C 70/16* (2013.01); *B29C 70/545* (2013.01); *B29K 2307/04* (2013.01); *B29L 2031/7739* (2013.01)

(58) Field of Classification Search
CPC .................. B29C 70/16; B29C 70/545; B29L 2031/7739; B29K 2307/04
See application file for complete search history.

(56) References Cited

U.S. PATENT DOCUMENTS

2019/0009477 A1 *  1/2019  Gordon .............. B29D 99/0005

* cited by examiner

*Primary Examiner* — Vishal I Patel
(74) *Attorney, Agent, or Firm* — Greer, Burns & Crain, Ltd.

(57) ABSTRACT

A method and apparatus for forming a continuously molded carbon fiber reinforced polymer slender curved frame. A continuous supply of uncured carbon fiber reinforced polymer material is directed into a forming tool. The uncured carbon fiber reinforced polymer material is continuously molded into a desired shape in the forming tool. The carbon fiber reinforced polymer material is cured into a frame of the desired shape in the forming tool. The frame is removed from the forming tool. An out-of-plane curvature is put in the frame while the frame is in at least a portion of the forming tool.

3 Claims, 3 Drawing Sheets

CONTINUOUS MOLDED CARBON FIBER REINFORCED POLYMER SLENDER CURVED COMPONENT

CROSS REFERENCE TO RELATED APPLICATIONS

This application claims the benefit of the Provisional U.S. Patent Application No. 62/844,951 filed May 8, 2019, the entire disclosures of which are incorporated herein by way of reference.

FIELD OF THE INVENTION

The present invention is directed to a method and apparatus for continuously molding carbon fiber reinforced polymer (CFRP) slender components.

BACKGROUND OF THE INVENTION

To reduce costs and weight of CFRP aircraft, it is typically better to have more integrated components with fewer joints and parts, and where possible, to manufacture these with a continuous production/molding system.

Continuous CFRP molding has been achieved typically with constant section, straight parts, such as rails, stringers, cross beams and the like, but where geometries vary such as fuselage frames (typically curved, even of circular shape) this is not easy in a continuous process and other processes like 1-shot press forming are often used. Expanding continuous molding to fuselage frames would create an opportunity to reduce cost and also reduce product complexity and weight by reducing the number of joints.

It is clearly possible by creating a curved mold tool to create in semi-continuous fashion a curved shape, but what has not been possible has been to create a full fuselage frame in a continuous manner. Either the frame has to be cut into multiple parts, requiring several joints adding weight and assembly costs, and/or the process is simply not continuous as it has to avoid the possibility that the geometry causes a clash with the mold tooling or associated equipment.

SUMMARY OF THE INVENTION

An embodiment of the invention comprises a method for forming a continuously molded carbon fiber reinforced polymer slender curved component. Steps of the method include:
  directing a continuous supply of uncured carbon fiber reinforced polymer material into a forming tool,
  continuously molding the uncured carbon fiber reinforced polymer material into a desired shape in the forming tool,
  curing the carbon fiber reinforced polymer material into a component of the desired shape in the forming tool,
  removing the component from the forming tool, and
  putting an out-of-plane curvature in the component.

In an embodiment, the out-of-plane curvature is put into the component while the carbon fiber reinforced polymer material is in the forming tool.

In an embodiment, the out-of-plane curvature is put into the component after the carbon fiber reinforced polymer material has been removed from the forming tool.

In an embodiment, the method includes cutting the component into a component part of a desired length.

In an embodiment, the method includes a further heating and re-curing process to eliminate the out-of-plane curvature after the component has been cut into the component part.

The invention also comprises an apparatus for forming a continuously molded carbon fiber reinforced polymer slender curved component. The apparatus includes a forming tool configured to receive a continuous supply of uncured carbon fiber reinforced polymer material, the forming tool having a shape conforming to a desired shape for the carbon fiber reinforced polymer slender curved component, an arrangement for at least partially curing the carbon fiber reinforced polymer material into a component, and an arrangement for putting an out-of-plane curvature in the component.

In an embodiment, the arrangement for putting an out-of-plane curvature in the component comprises a curvature built into the forming tool.

In an embodiment, the arrangement for putting an out-of-plane curvature in the component comprises a series of rollers arranged downstream of the forming tool to receive the at least partially cured component and to deflect the at least partially cured component out of a plane in which the carbon fiber reinforced polymer is directed through the forming tool.

In an embodiment, the apparatus further comprises a tool for cutting the component into a component part of a desired length.

In an embodiment, the apparatus further comprises a tooling jig configured to receive the component part and a heater configured to heat and re-cure the component part to eliminate the out-of-plane curvature.

DETAILED DESCRIPTION OF THE PREFERRED EMBODIMENTS

Figure 1:
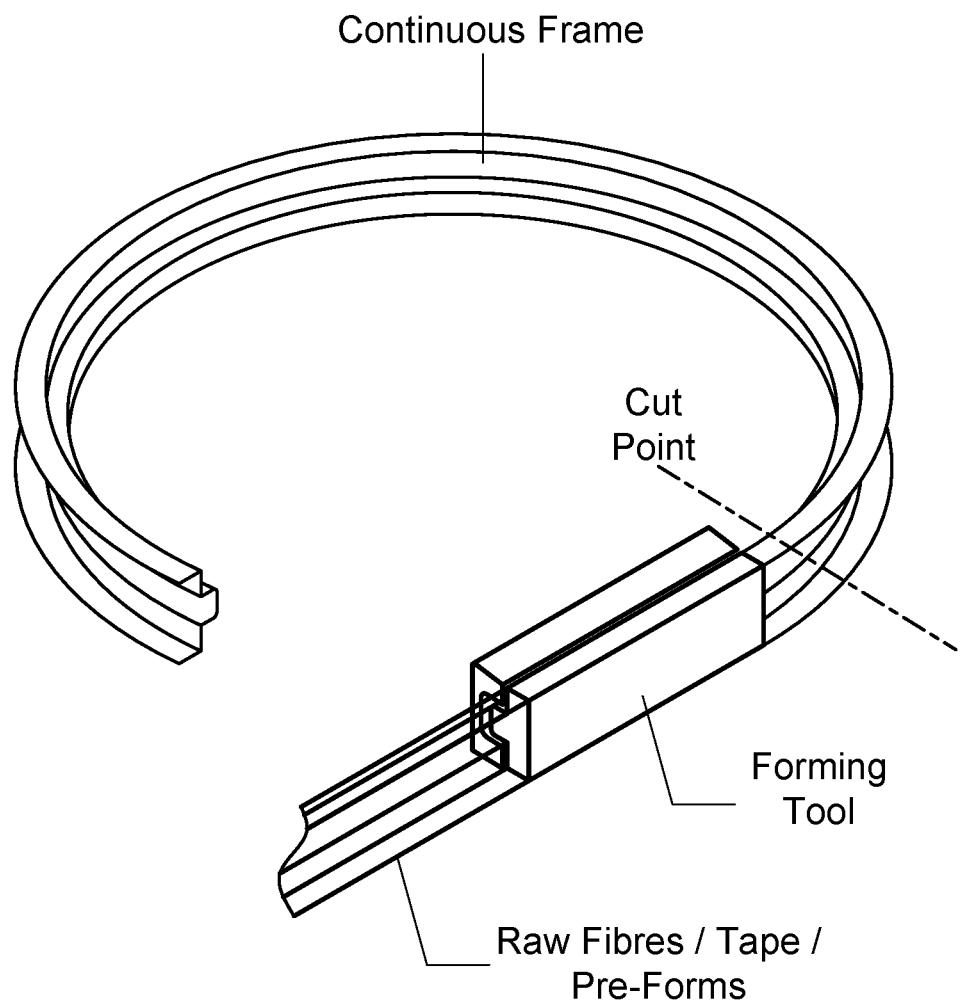
FIG. 1 is a schematic isometric view of a forming tool and arrangement for forming a continuously molded fuselage frame element.
Figure 2:
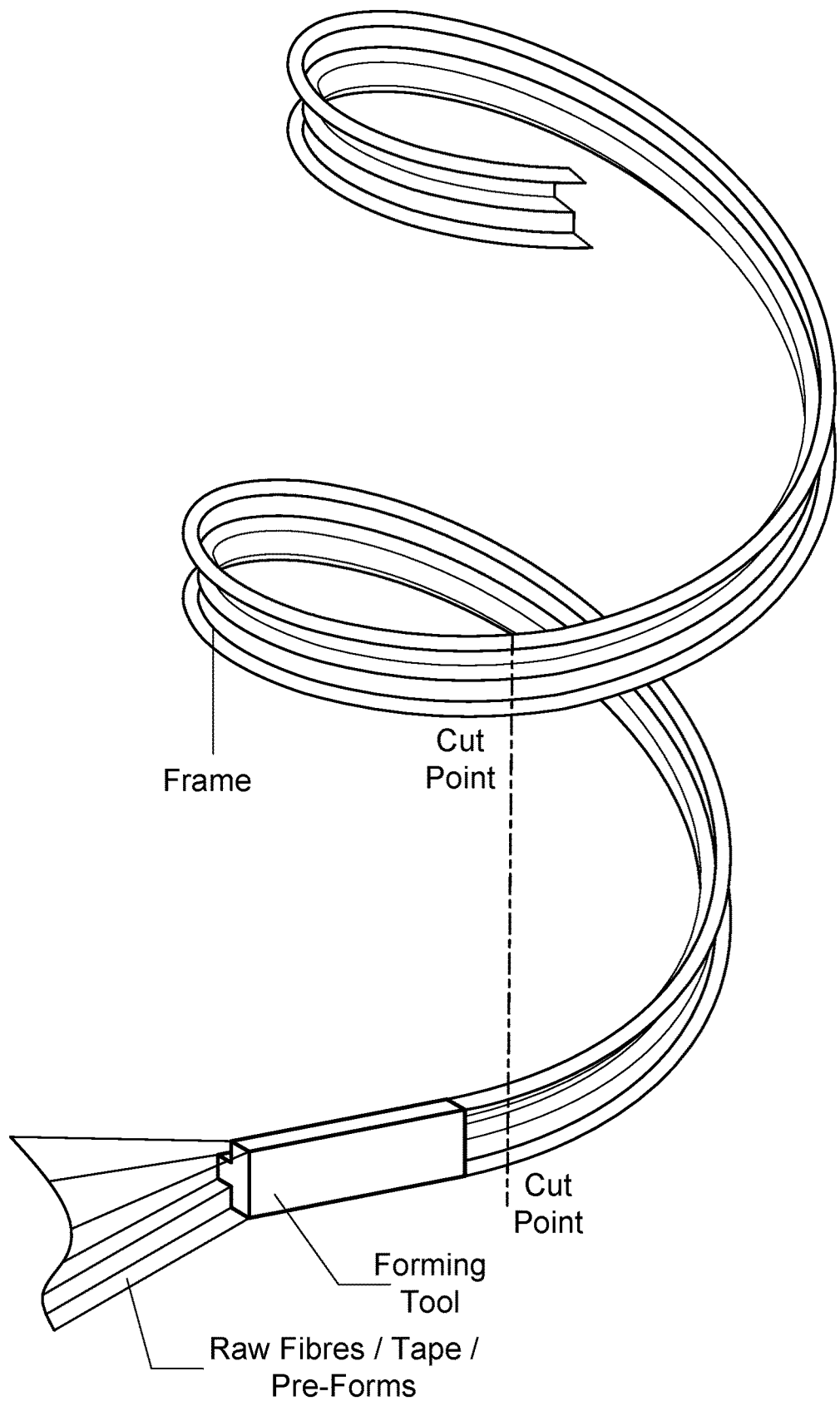
FIG. 2 is a schematic side elevational view of an arrangement for a forming tool for forming continuously molded CFRP curved components.

FIGS. 1 and 2 schematically illustrate the key innovation for creating a continuously molded fuselage frame 20 by deliberately introducing an offset, a 'cork-screw' or 'pigtail' effect, either by deliberately putting an out-of-plane curvature in the frame through a shape of a mold 22 in a mold tool 24, or a carefully managed deflection of the molded frame in a cured section 26 away from the mold tool. This later variation of the concept takes advantage of the fact that away from the assembled structure (such as fuselage frame to fuselage skin), a frame component 28 separated from the continuous fuselage frame 20 has an inherent degree of flexibility if it is sufficiently slender. The deflection could, for example, be managed by a series of rollers 30 to support the continuous frame 20 to be in-plane in the section of the frame 20 immediately after curing in the mold tool 24 to ensure no unintended warping, but then deliberately deflected taking advantage of the flexibility of the frame with a later series of rollers 32 to deflect the frame. This induced deflection would be undertaken at the point the where the distance from the mold tool 24 is sufficient in terms of geometry and thermal cure that unplanned permanent warping is no longer an issue. Thus, a forming tool which may comprise the mold tool 24 alone, or in combination with a series of rollers 30, 32, may be used to impart the offset into the continuous fuselage frame 20 as it is being fabricated.

The continuous frame 20 in both instances (either deflection induced by the mold 22 geometry or deflection induced mechanically) then has the curved continuously molded stock cut by a tool 34 into the useful component 28, at an appropriate point, such as point 36, when a desired full curved component 28 is complete. The position of this point 36 is determined so that the useful component 28 can extend over a full 360 degrees 28 (e.g., fuselage frame), or less than 360 degrees, dependent on the need of the component 28 (e.g., in the case of a fuselage frame to allow for a door cut-out).

The 'corkscrew' configuration is planned in such a way that the cured section of the molded fuselage frame 20 does not clash with the tooling necessary to create the continuous frame at any point. The cutting of the component 28 from the continuous frame 20 can be effected by various means, e.g., mechanical, water or other typical and known CFRP cutting means.

For very slender components with a proportionally low angle required in the 'corkscrew,' the molded frame 20 can be designed from a stress perspective that the off-set is planned into the structural margin of the component 28 and the off-set is simply mechanically pulled into line when the frame 20 is connected through a form of a coupling, i.e., the mechanical 'correction' is accounted for as acceptable build stress. This would be necessary in the case of the innovation being applied to thermoset components 28 where there it is not usually a possibility to reset the shape after curing.

Figure 3:
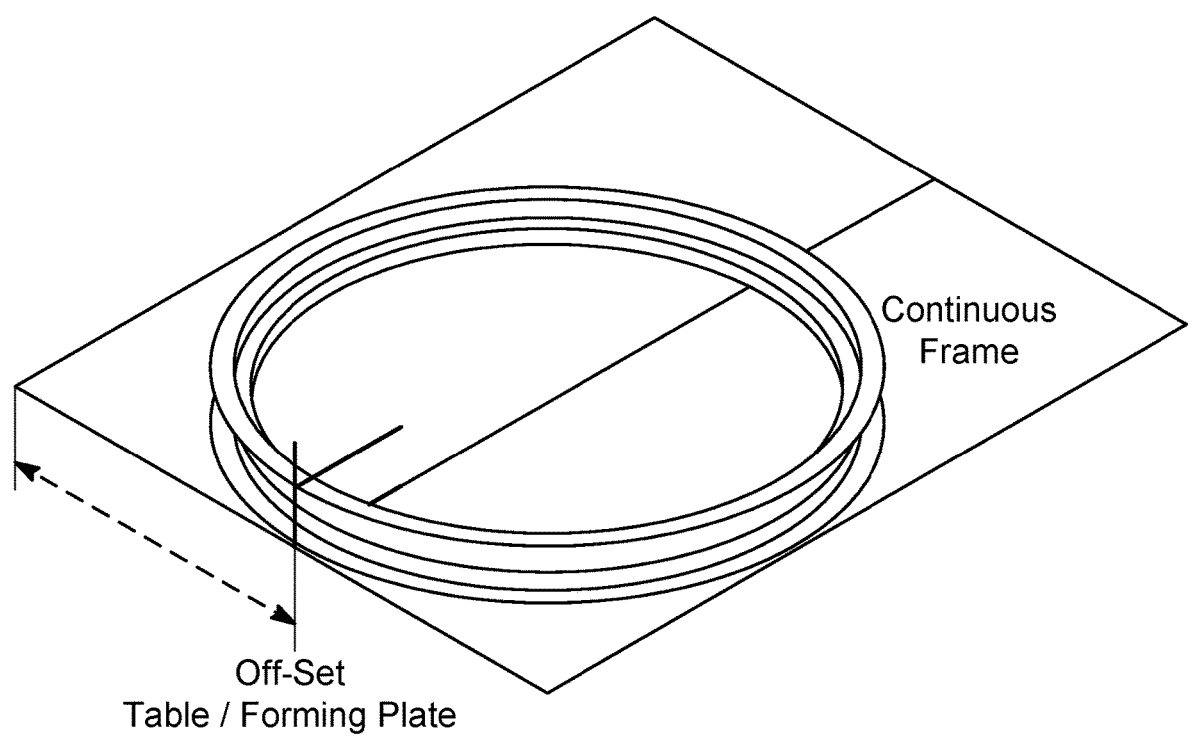
FIG. 3 is a schematic perspective view of an optional additional step for reforming/adjustment of a continuously molded curved part in CFRP thermoplastic.

The additional opportunity, if the innovation is applied to thermoplastic components 28, is that a further heating and re-curing process to 'correct' or eliminate the off-set of the component can be possible, potentially by mounting the component after it is cut from the molded frame 20 on a table 40 or other appropriate tooling jig, as shown in FIG. 3. This additional step, utilizing the beneficial leverage of thermoplastic CFRP material, would allow the build stress to be reduced or eliminated completely, and could additionally be used to adjust for any other minor geometrical misalignments (such as radii, flange angle, off-set) that occur within the component 28.

It should be recognized that the slenderness required for this innovation to work, depends on the level of build stress that can be accepted for a thermoset component 28, or the amount of reforming and/or build stress that can be accepted for a thermoplastic component. This factor will make the innovation particularly appropriate for more slender components such as fuselage frames, but the innovation can still be considered appropriate for less slender components as long as the re-forming or build stress is accommodated within the design of the component.

Thus, a method for forming the continuously molded carbon fiber reinforced polymer slender curved frame 20, is provided, comprising the following steps.
- directing a continuous supply of uncured carbon fiber reinforced polymer material 42 into the forming tool 24, 30, 32,
- continuously molding the uncured carbon fiber reinforced polymer material 42 into a desired shape in the forming tool 24, 30, 32,
- curing the carbon fiber reinforced polymer material 42 into the continuous frame 20 of the desired shape in the forming tool 24, 30, 32,
- removing the frame 20 from the forming tool 24, 30, 32, and
- putting an out-of-plane curvature in the frame 20.

The out-of-plane curvature may be put into the frame 20 while the carbon fiber reinforced polymer material 42 is in the forming tool 24, 30, 32.

The forming tool may comprise a molding tool 24, and the out-of-plane curvature may be put into the continuous frame 20 while the carbon fiber reinforced polymer material 42 is in the molding tool.

The forming tool may comprise a molding tool 24 and spaced rollers 30, 32, and the out-of-plane curvature may be put into the frame 20 by one or more of the rollers 30, 32 after the carbon fiber reinforced polymer material 42 has been removed from the molding tool 24.

The frame 20 may be cut by a tool 34 into the component 28 of a desired length.

The method may include a further heating and re-curing process to eliminate the out-of-plane curvature after the component 28 has been cut from the frame 20.

As discussed above, an apparatus is provided for forming the continuously molded carbon fiber reinforced polymer slender curved frame 20, which comprises the forming tool 24, 30, 32 configured to receive a continuous supply of uncured carbon fiber reinforced polymer material 42. The forming tool has a shape in the portion comprising the molding tool 24 conforming to the desired shape for the carbon fiber reinforced polymer slender curved frame. The forming tool 24, 30, 32 is configured, such as due to a size and length of the forming tool, to at least partially cure the carbon fiber reinforced polymer material 42 into the continuous frame 20. A physical size and shape of the forming tool 24, 30, 32 is configured to put an out-of-plane curvature in the frame 20.

The physical size and shape of the forming tool 24, 30, 32 for putting an out-of-plane curvature in the continuous frame 20 could comprise a curvature built into the molding tool portion 24 of the forming tool.

The physical size and shape of the forming tool 24, 30, 32 for putting an out-of-plane curvature in the continuous frame 20 could comprise the series of rollers 30, 32 arranged downstream of the molding tool 24 portion of the forming tool to receive the at least partially cured frame and to deflect the at least partially cured frame out of a plane in which the carbon fiber reinforced polymer 42 is directed through the forming tool.

The tool 34 may be provided to cut the continuous frame 20 into the component 28 of a desired length. Such a component 28 is shown in FIG. 3.

A tooling jig 40, in the form of a table with a flat upper surface, may be provided which is configured to receive the component 28 and a heater 42 may be provided which is configured to heat and re-cure the component to eliminate the out-of-plane curvature.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise.

The invention claimed is:

1. An apparatus for forming a continuously molded carbon fiber reinforced polymer slender curved frame, comprising:
   a forming tool configured to receive a continuous supply of uncured carbon fiber reinforced polymer material,
      the forming tool having a shape conforming to a desired shape for the carbon fiber reinforced polymer slender curved component,
      the forming tool being configured to at least partially cure the carbon fiber reinforced polymer material into a continuously molded frame,
      a physical size and shape of the forming tool being configured to put an out-of-plane curvature in the frame,
      wherein the size and shape of the forming tool for putting the out-of-plane curvature in the component comprises a series of rollers arranged downstream of a molding tool portion of the forming tool to receive the at least partially cured frame and to deflect the at least partially cured frame out of a plane in which the carbon fiber reinforced polymer is directed through the molding tool portion.

2. The apparatus according to claim 1, wherein the physical size and shape of the forming tool for putting the out-of-plane curvature in the component comprises a curvature built into a molding tool portion of the forming tool.

3. An apparatus for forming a continuously molded carbon fiber reinforced polymer slender curved frame, comprising:
   a forming tool configured to receive a continuous supply of uncured carbon fiber reinforced polymer material,
      the forming tool having a shape conforming to a desired shape for the carbon fiber reinforced polymer slender curved component,
      the forming tool being configured to at least partially cure the carbon fiber reinforced polymer material into a continuously molded frame,
      a physical size and shape of the forming tool being configured to put an out-of-plane curvature in the frame,
   further comprising a tool for cutting the frame into a component of a desired length, and
   further comprising a tooling jig configured to receive the component and a heater configured to heat and re-cure the component to eliminate the out-of-plane curvature.

* * * * *